United States Patent [19]
Bartholet

[11] Patent Number: 5,108,140
[45] Date of Patent: Apr. 28, 1992

[54] RECONFIGURABLE END EFFECTOR

[75] Inventor: Stephen J. Bartholet, Orange, Calif.

[73] Assignee: Odetics, Inc., Anaheim, Calif.

[21] Appl. No.: 512,042

[22] Filed: Apr. 17, 1990

Related U.S. Application Data

[63] Continuation of Ser. No. 182,795, Apr. 18, 1988, abandoned.

[51] Int. Cl.⁵ .............................................. B25J 15/10
[52] U.S. Cl. .................................. 294/106; 294/115; 901/38; 901/39
[58] Field of Search ................ 294/86.4, 88, 104, 106, 294/115, 116, 119.1; 623/26, 57, 63-65; 901/30-39

[56] References Cited

U.S. PATENT DOCUMENTS

| | | | |
|---|---|---|---|
| 3,694,021 | 9/1972 | Mullen | 294/111 X |
| 3,866,966 | 2/1975 | Skinner | 294/106 |
| 3,901,547 | 8/1975 | Skinner | 294/88 |
| 3,927,424 | 12/1975 | Itoh | 294/106 X |
| 4,094,016 | 6/1978 | Eroyan | 623/64 X |
| 4,351,553 | 9/1982 | Rovetta et al. | 294/106 |
| 4,364,593 | 12/1982 | Maeda | 294/106 |
| 4,401,407 | 8/1983 | Breckenridge | 294/106 X |
| 4,489,248 | 12/1984 | Petersen | 310/76 |
| 4,595,333 | 6/1986 | Ono et al. | 294/106 X |
| 4,623,183 | 11/1986 | Aomori | 294/86.4 |
| 4,643,473 | 2/1987 | Douglas | 294/86.4 X |
| 4,697,839 | 10/1987 | Fischer | 294/115 |
| 4,834,443 | 5/1989 | Crowder et al. | 294/106 |

FOREIGN PATENT DOCUMENTS

| | | | |
|---|---|---|---|
| 963850 | 10/1982 | U.S.S.R. | 294/106 |
| 1256956 | 9/1986 | U.S.S.R. | 294/106 |
| 2166710 | 5/1986 | United Kingdom | 901/38 |

OTHER PUBLICATIONS

IBM Technical Disclosure Bulletin, vol. 24, No. 7B, Dec. 1981, "Gripper with Variable Gripping Angles", by Schaefer (copy in 294/115).
Mechanical Hands Illustrated, by Ichiro Kato, Survey Japan 1982.
Robots, editor Philip de Ste. Croix (Salamander Books 1985) p. 53.
"Robotic Hand Approaches Human Dexterity", Machine Design, Jun. 26, 1986, pp. 40–44.
"Victory Intelligent Dexterous Hand and Forearm", Victory Enterprises Technology, Inc. (no date).

Primary Examiner—Johnny D. Cherry
Attorney, Agent, or Firm—Graham & James

[57] ABSTRACT

A highly reconfigurable end effector employing three digits, each having two pivoting degrees of freedom and a rotational degree of freedom. The digits have an asymmetrical configuration where two of the digits rotate about an offset axis and the third digit about a substantially non-offset axis allowing the digits to reconfigure about a payload. Each digit employs a strong, tendonless digit actuation mechanism for driving the pivoting degrees of freedom. A differential transmission in the digit actuation mechanism, in conjunction with a double parallelogram configuration formed by the moving segments, provides a selective enveloping or parallel vise grip grasping action of the end effector.

25 Claims, 12 Drawing Sheets

FIG. 3
FIG. 4
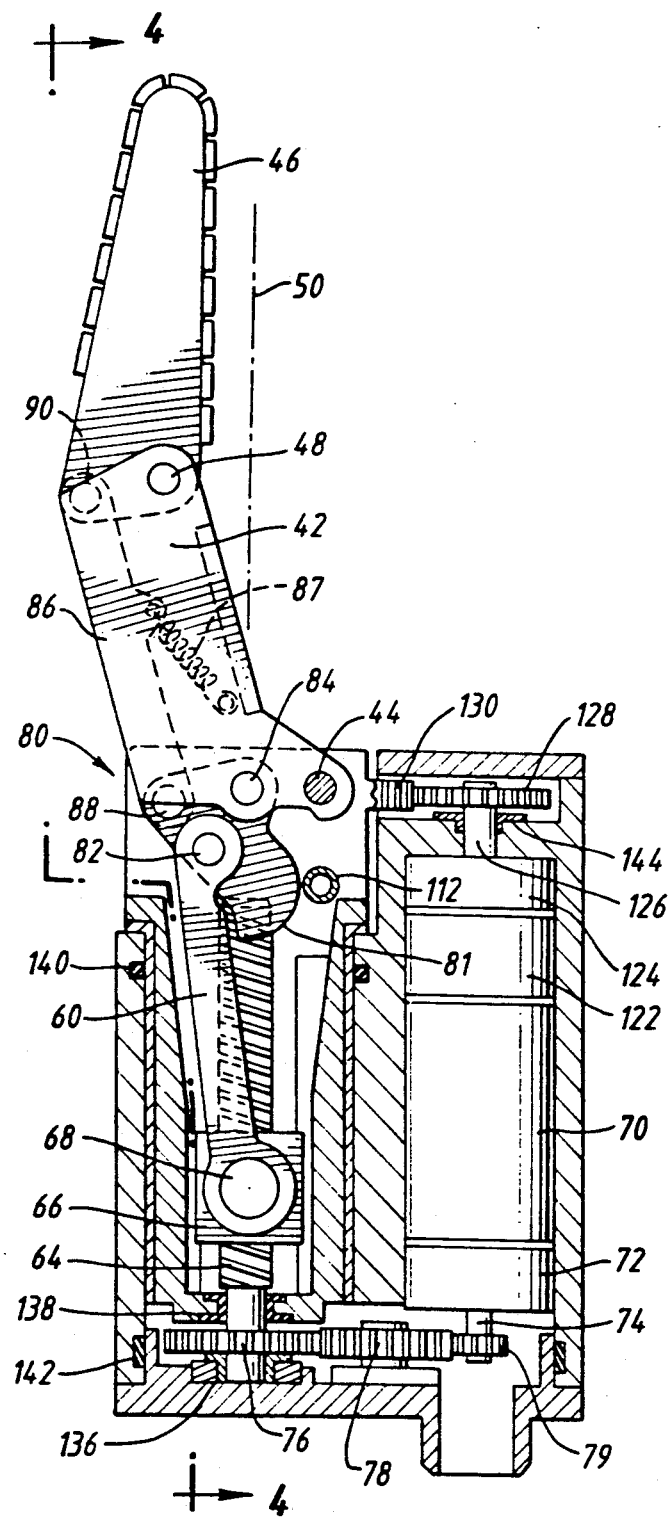
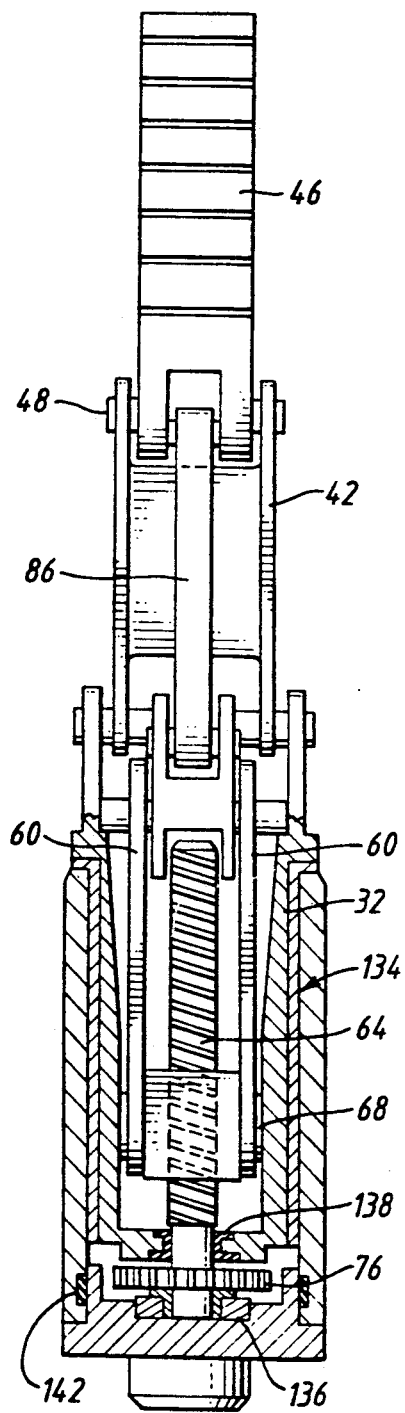

RECONFIGURABLE END EFFECTOR

This is a continuation of copending application Ser. No. 182,795, filed on Apr. 18, 1988, now abandoned.

BACKGROUND OF THE INVENTION

1. Field of the Invention

The present invention relates to end effectors used in robotics and other applications. More particularly, the present application relates to reconfigurable end effectors.

2. Description of the Prior Art and Related Information

End effectors, sometimes referred to as mechanical hands or robotic hands, are employed for a wide range of applications where mechanical manipulation is required. In particular, virtually any industrial or other application of robotics requires an end effector of some type to provide a manipulation capability. Accordingly, a wide variety of different types of end effectors are known in the art and a great deal of effort has gone into their design and development.

Prior art end effectors may be broadly grouped into two types: end effectors designed for specific applications, typically industrial applications, and application non-specific end effectors which are reconfigurable to adapt to various tasks.

Application specific end effectors are widely employed in industry in various applications such as welding, assembly, holding objects for drilling and punching, etc. Application specific end effector designs typically have relatively few degrees of freedom and limited reconfigurability. Specific designs of such application specific end effectors include curved end effectors for encircling or clamping round or cylindrical objects, multiple pronged end effectors for providing a concentric grip on curved objects, end effectors for providing a plier type grip for grasping objects, platform-like end effectors for providing a cradling or lifting force and many other specific configurations employed for specific applications. A wide variety of such application specific end effectors are illustrated in *Mechanical Hands Illustrated*, Ichiro Kato, ed. (Survey Japan 1982). Typical actuation mechanisms for such application specific end effectors include hydraulic and worm gear type mechanisms due to their simplicity and strength. The principal advantages of application specific end effectors are high strength, relatively simple control algorithms, relatively simple mechanical structures with a limited number of moving parts, and durability. Such end effectors are limited in their reconfigurability, however, and need to be specially designed for each application.

Application non-specific end effectors typically have designs directed to providing a high degree of reconfigurability and manipulation capability rather than strength or durability. As a result, such end effector designs are usually complex, having a large number of degrees of freedom and complex actuation mechanisms. Frequently application non-specific end effectors attempt to emulate the human hand and therefore application non-specific end effectors are often referred to as robotic hands. The most widely known and highly regarded robotic hands employ three to four digits, each digit having two or three degrees of freedom. The motion of the individual digits is typically controlled by tendons coupled to actuators displaced from the robotic hand itself.

One such robotic hand is the Utah-MIT dextrous hand which has been described, for example, in *Machine Design (June 26, 1986)*, p. 40. The Utah-MIT dextrous hand has four digits, three fingers and a "thumb" (i.e., an opposable digit), each digit activated by a series of tendons routed over pulleys. The tendons are in turn connected to pneumatic actuators displaced from the hand. The Utah-MIT dextrous hand also has a "wrist" degree of freedom with associated tendons, pulleys and actuators. In combination the hand and wrist employ 184 pulleys for guiding the tendons.

Another example of a highly reconfigurable robotic hand is the so-called Salisbury hand. The Salisbury hand is shown, for example, in *Robots*, Philip de Ste. Croix, ed. (Salamander Books 1985), p. 53. The Salisbury hand has three digits each having three joints. The digits of the Salisbury hand are also tendon controlled providing independent control of all nine joints in the hand. A complex mathematical control algorithm in combination with the nine degrees of freedom of the hand results in a highly manipulative hand.

Another highly reconfigurable hand is manufactured by Victory Enterprises Technology, Inc. of Austin, Tex. The Victory Enterprises Robotic Hand has four digits, one of which is opposable in a manner emulating the human hand in general design. The Victory Enterprises hand is also tendon controlled with the tendons coupled to linear lead screw type actuators.

The above-described tendon controlled robotic hands, while having a high degree of adaptability for various grasping and holding applications, suffer from a lack of strength suitable for many industrial or other heavy applications. Such tendon actuated robotic hands often do not have significantly more grasping or holding power than a human hand. Also, the large numbers of pulleys and tendons used to independently control the various joints of the digits require complex mechanical designs with many moving parts. Such complexity and large numbers of moving parts adds to the cost of the robotic hand and also increases the possibility of failure of the hand. The complexity also requires complex control algorithms which add to the cost and complexity of the overall system. As a result, highly reconfigurable robotic hands are at present relegated to a research role and are not suitable for industrial or other commercial applications.

Therefore, a need presently exists for a robotic hand having high strength, durability, and a relatively simple mechanical structure not requiring complex control algorithms, while having a high degree of reconfigurability and adaptability for different tasks.

SUMMARY OF THE INVENTION

The present invention provides an end effector having a high degree of reconfigurability suitable for a wide variety of grasping and clamping tasks.

The present invention further provides a highly reconfigurable end effector having a strong digit actuation system, The present invention further provides a highly reconfigurable end effector requiring only a relatively simple control algorithm.

The present invention further provides a highly reconfigurable end effector having relatively few moving parts and a high degree of wear and shock resistance.

The present invention further provides an end effector having the capability to automatically envelope and clamp an object or, alternatively, automatically grip an object in a parallel vise grip, in an optimal manner without the use of a control algorithm or sensors.

In a preferred embodiment, the present invention provides an end effector having three digits, each digit having two pivoting degrees of freedom and a third rotational degree of freedom about an axis adjacent the base of the digit. The three digits are arranged in an asymmetrical configuration with the axes of rotation of the first, second and third digits preferably substantially parallel. Two of the digits have offset axes of rotation allowing the digits to swing up to 180° about the object to be grasped while the third digit preferably rotates about a non-offset axis. The asymmetrical configuration of the digits and the three axes of rotation allows essentially an infinite number of different positions for the digits and hence a corresponding number of different grips. In particular, the asymmetrical configuration of the digits allows the digits to grasp in an opposing "parallel jaw" grip or reconfigure to a coincident digit configuration for cradling and other anthropomorphic grips.

Each digit is independently actuated in both the pivoting and rotational degrees of freedom. Each digit employs a single actuation mechanism which drives both pivoting degrees of freedom of the digit. The pivoting drive torque is provided by a drive linkage coupled to a lead screw type linear actuator which is in turn driven by a motor. The drive linkage is coupled to a differential lever transmission which selectively drives the digit segments about first and second pivot joints, respectively. The differential transmission and digit segments are configured such that when an object is encountered first with the base segment of the digit or an inner portion of the tip segment of the digit the digit will automatically envelope the object by virtue of preferential driving of the second pivot joint. If the object is contacted first with an outer portion of the tip segment, however, the digit is preferentially driven about the first pivot joint thereby grasping the object in a parallel vise type grip. A tip segment parallel stop, in conjunction with a double parallelogram configuration formed by various segments in the drive mechanism, prevents the tip segment of the digit from bending over backwards enabling the parallel vise grip capability.

BRIEF DESCRIPTION OF THE DRAWINGS

FIG. 3 is a cross-section through a single digit of the end effector of the present invention illustrating the digit actuation mechanism.

FIG. 4 is a cross-section showing an end view of the digit of FIG. 3.

DESCRIPTION OF THE PREFERRED EMBODIMENT

Figure 1:
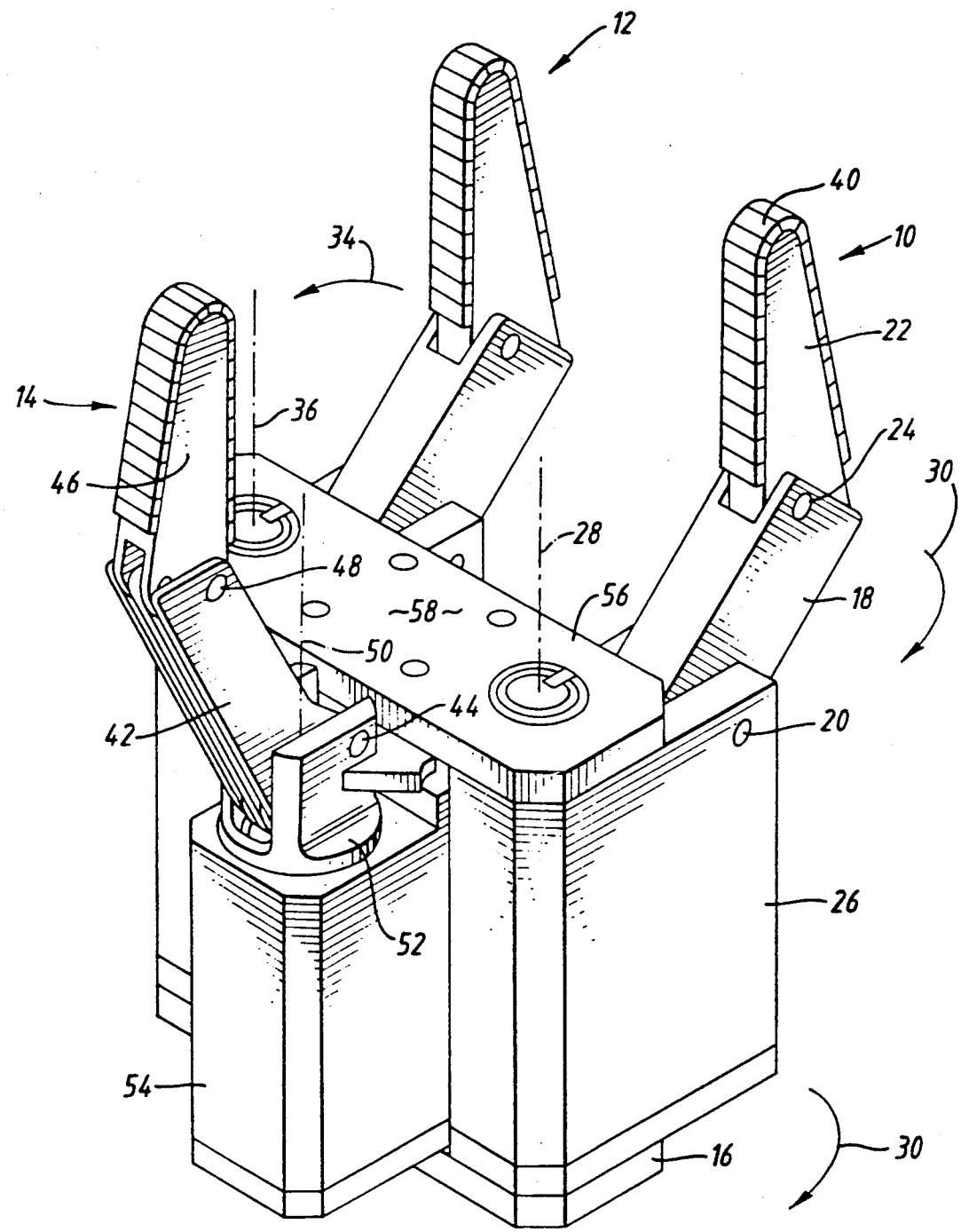
FIG. 1 is a perspective view showing a preferred embodiment of the end effector of the present invention.
Figure 2:
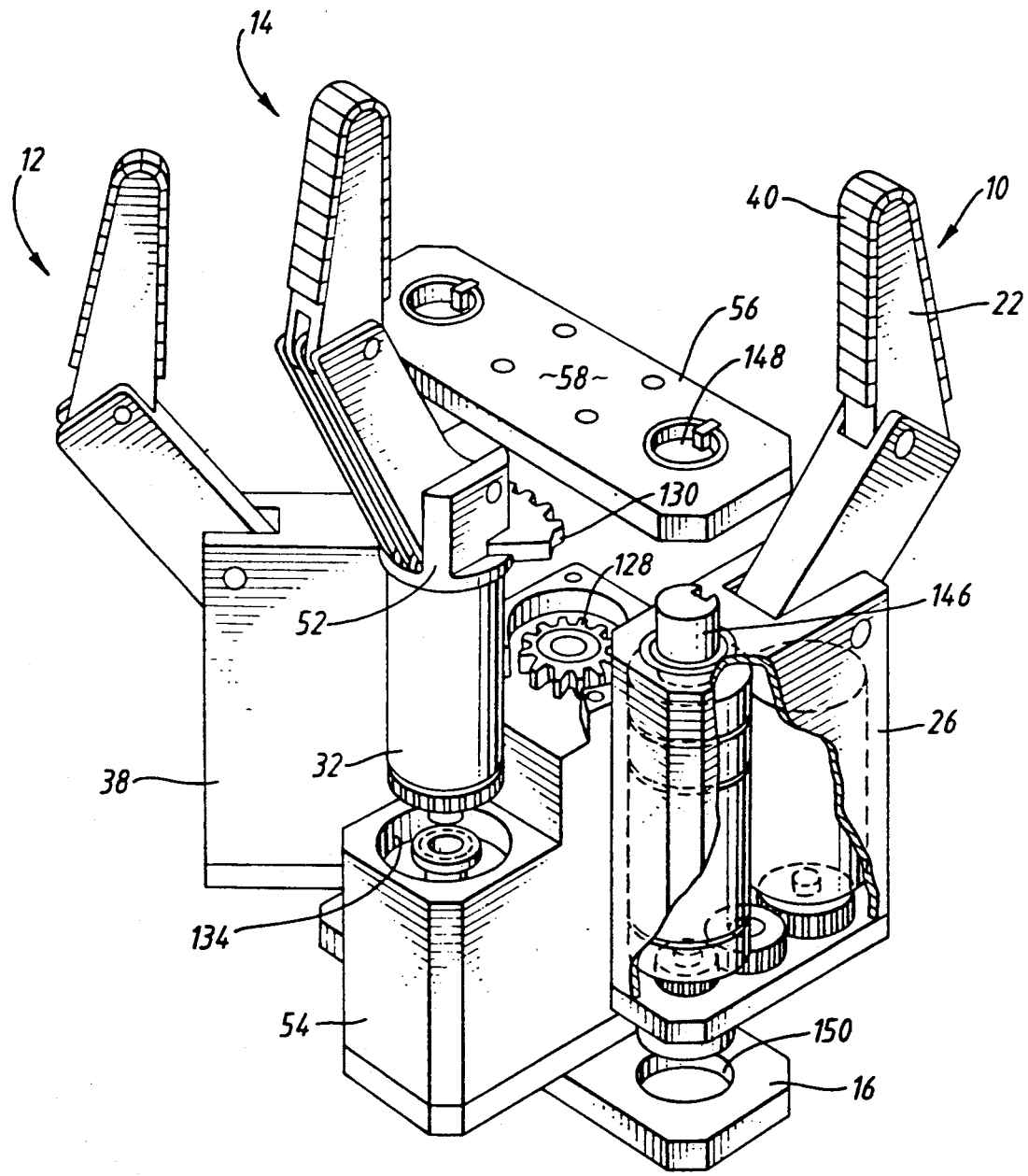
FIG. 2 is an exploded view of the end effector of FIG. 1.

Referring to FIGS. 1 and 2, a preferred embodiment of the end effector of the present invention is shown in perspective and exploded views, respectively. In the preferred embodiment shown, the end effector includes three digits 10, 12 and 14, mounted on a mounting plate or wrist member 16. In a typical application, the wrist member 16 will in turn be attached to some type of mechanical arm mechanism (not shown) and will be coupled through the arm mechanism to a control system, such as a computer equipped with appropriate control algorithms for controlling the operation of the end effector.

Each of the digits 10, 12, 14 is provided with three degrees of freedom corresponding to two pivoting degrees of freedom about two joints and a rotational degree of freedom. More specifically, referring to digit 10 shown in FIG. 1, digit 10 has a base segment 18 mounted on a base 26 and a tip segment 22 coupled to base segment 18. Base segment 18 has freedom to pivot about a first pivot joint 20 and tip segment 22 pivots about a second pivot joint 24. Tip segment 22 and base segment 18 of digit 10 are coupled via first pivot joint 20 to the base 26 of the digit 26. Base 26 is in turn mounted on the wrist member 16. Base 26 of digit 10 contains the digit actuation mechanism for actuating the pivoting motion of the base and tip segments 18, 22 respectively, during grasping operations of the end effector. Also, base 26 is rotatable about an axis 28 in the direction of arrow 30. The drive mechanism for such rotational motion is preferably housed in base 26. Alternatively the drive mechanism may be housed in the wrist member 16 (with suitable modification to the specific structure disclosed herein). The axis of rotation 28 is preferably in a direction substantially perpendicular to the pivoting axes of digit 10 through joints 20 and 24. The axis of rotation 28 is offset from the first pivot joint 20 giving the digit 10 the capability to swing in a large arc in angular direction 30 through a range of up to 180° for continuous reconfiguration to various positions including repositioning on the opposite side of the payload.

The pivoting and rotational degrees of freedom of digit 12 are the same as for digit 10 described above, with however digit 12 including base 38 (shown in FIG.

2) rotating in the direction of arrow 34 about axis 36, i.e. in the opposite angular direction from digit 10. As in the case of digit 10, base 38 of digit 12 preferably contains the rotational actuation mechanism for independently repositioning digit 12. Digit 12 thus has the same capability of digit 10 to independently swing about the payload to an essentially infinite number of positions including reconfiguring on the opposite side of the payload if desired.

Digit 14 similarly has a base segment 42, pivotable about a first pivot joint 44, and a tip segment 46 pivotable about a second pivot joint 48, in a manner the same as digits 10 and 12. Digit 14 is also similarly mounted to a base 52 which is rotatable about an axis 50. As shown in FIG. 2, rotatable digit base 52 is coupled to a cylindrical canister 32. Canister 32 fits within a housing 54, provided to house the independent rotational actuation mechanism for digit 14, so as to freely move therein. Canister 32 houses the actuation mechanism for pivoting the digit 14 about the first and second pivot joints 44 and 48, respectively. A palm plate 56 for receiving the object, or payload, to be grasped by the end effector, is mounted to the top surface of housing 54. Palm plate 56 has an upper surface 58 which may be provided with tactile sensors or other sensors for detecting the position of the payload.

Digits 10, 12 and 14 may also be provided with removable grippers 40 on the tip segments which may be adapted to the specific grasping application of the end effector. For example, for grasping objects which are fragile, the gripper 40 may be of a soft rubber or similar material. For grasping heavy payloads, such as pipes, the grippers 40 could be made of a hard metal with a serrated edge such as found in industrial clamps and vise grips. Also, grippers 40 may include tactile or other sensors for providing information to the control mechanism.

Figure 9:
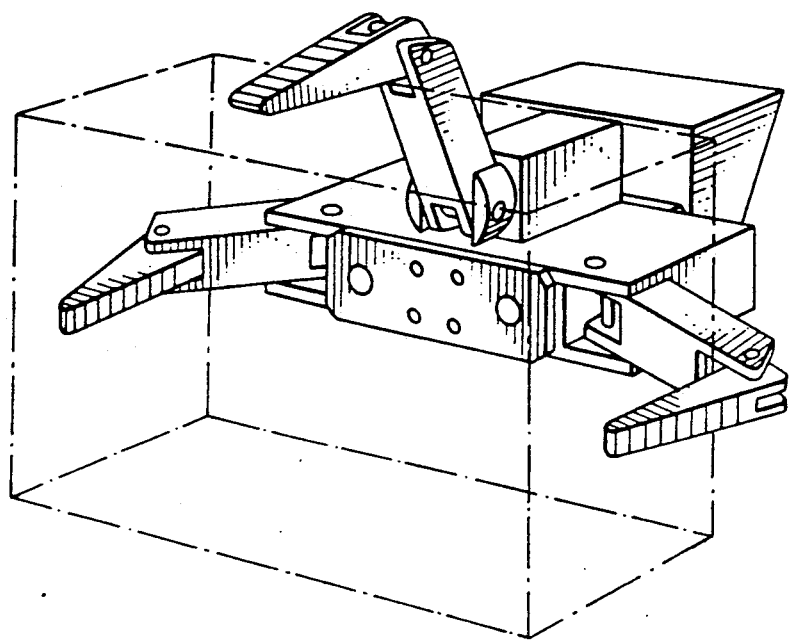
FIG. 9 is a drawing illustrating a wide grip mode of the end effector of the present invention.
Figure 10:
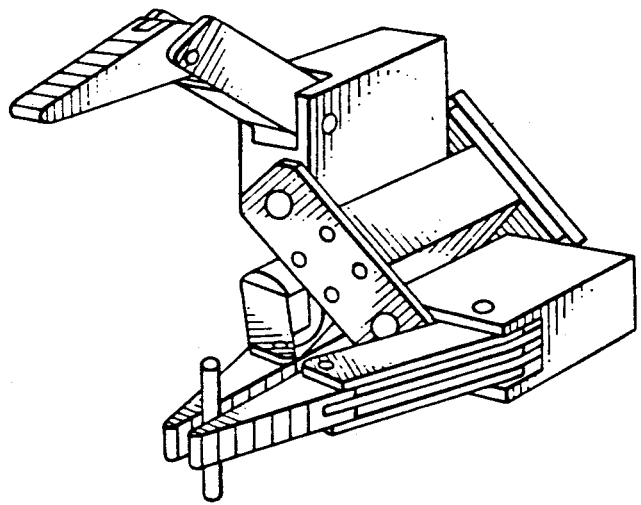
FIG. 10 is a drawing illustrating a parallel, needle nose plier type grip of the end effector of the present invention suitable for gripping small objects.

The combination of digits 10 and 12 having independent rotational degrees of freedom about offset axes 28 and 36, respectively, and digit 14 being independently rotatable about a non-offset axis 50, and the asymmetrical configuration of the digits provides a high degree of reconfigurability to the end effector. In particular, the off-set axes of rotation of digits 10 and 12 allows them to be independently repositioned about the payload to be grasped. This allows the three digits 10, 12 and 14 to be positioned in an optimal manner for grasping the payload. For example, for grasping a variety of cylindrical or spherical objects digits 10, 12 and 14 may be positioned at 120° intervals around the payload. This configuration can be used for a variety of grips such as illustrated in FIGS. 11 and 12. For grasping wide objects, digits 10 and 12 can be positioned at 180° from each other on opposite sides of the payload thereby giving maximum grasping width between the tip segments of digits 10 and 12. This type of configuration is illustrated in FIG. 9. Alternatively, for grasping relatively small objects one of the off-axis digits 10 or 12 may be rotated partially toward digit 14 to provide a "parallel needle nose plier" type of grasp as illustrated in FIG. 10. The configuration shown in FIG. 1, i.e. with off-axis digits 10 and 12 opposed to digit 14, may be employed for grasping a variety of objects, as illustrated in FIG. 13. In yet another configuration, digits 10 and 12 may be positioned on the same side of the payload as digit 14 resulting in an anthropomorphic grip suitable for various cradling and lifting operations. Examples of such cradling and lifting operations are illustrated in FIG. 14.

A wide range of other configurations of the three digits 10, 12 and 14 are also possible, depending on the specific application and object desired to be grasped. Indeed, since all three digits 10, 12, 14 are independently and continuously rotatable through a wide angular range, essentially an infinite number of configurations are possible. Other advantages of the various configurations adoptable by the end effector of the present invention will be described below after a discussion of the digit actuation mechanism of the present invention.

Referring to FIGS. 3, 4, 5, 6a, 6b, 7a, 7b, and 8, the digit actuation mechanism employed in the robotic hand of the present invention will be described.

Figure 5:
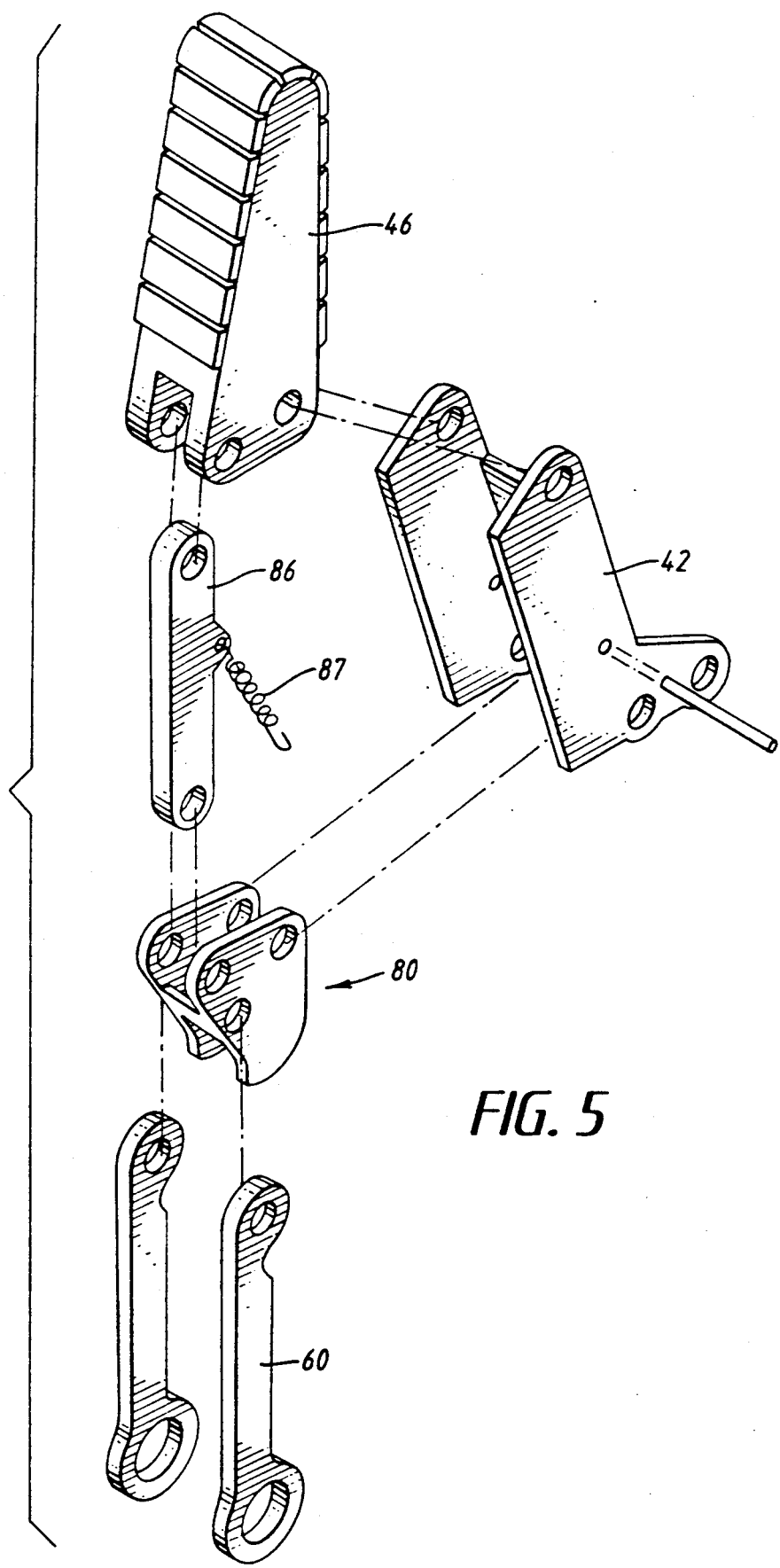
FIG. 5 is an exploded view of a portion of the digit actuation mechanism shown in FIGS. 3 and 4.

Referring first of all to FIGS. 3, 4, and 5, two cross sections and an exploded view of a preferred embodiment of the digit actuation mechanism employed in the end effector of the present invention are illustrated. The preferred digit actuation mechanism is a mechanical lever type actuator as opposed to tendon and pulley type actuation systems commonly employed in highly reconfigurable robotic hands. The digit actuation mechanism includes a linkage 60 which is driven vertically by lead screw 64 in conjunction with nut 66. The linkage 60 is coupled to the nut 66 by a pivot shaft 68 which allows the upper end of linkage 60 to move slightly in the horizontal direction as the nut 66 is driven up and down by rotation of the lead screw 64. The rotation of lead screw 64 is driven by motor 70 through speed reduction mechanism 72 and drive shaft 74. The speed reduction mechanism 72 includes gearing selected to provide desired torque and speed characteristics of the digit actuation mechanism, which gearing may be altered for different applications, as well as a clutch mechanism for allowing selective engagement of the motor with the lead screw 64. As will be described below, motor 70 also drives the rotation of digit 14 about axis 50 and speed reduction mechanism 72 and the clutch therein further enables such dual function of motor 70. The rotational motion of drive shaft 74 is provided to lead screw 64 via a gear train comprising first, second and third interlocked gears 76, 78, 79 respectively with first gear 76 coupled to the lead screw and third gear 79 coupled to the drive axle 74.

Although, the lead screw mechanism illustrated may be employed for a wide variety of applications, specific applications may make some modifications desirable. For example, for heavy payloads a ball nut and ball screw may be desirable to reduce friction in the drive mechanism. Also, a hydraulic system could be employed with lead screw 64 and nut 66 replaced by a hydraulic piston and cylinder mechanism.

The rotational motion of lead screw 64 is provided through nut 66 and linkage 60 as a linear drive force to differential transmission 80. Differential transmission 80 serves to translate the generally linear motion of drive linkage 60 into a pivoting motion of the base segment 42 and tip segment 46 about pivot joints 44 and 48, respectively. The drive linkage 60 is coupled to the differential transmission 80 through freely rotating joint 82. The differential transmission 80 is in turn coupled to digit base segment 42 through freely rotating joint 84 and to digit linkage 86 through freely rotating joint 88. The other end of digit linkage 86 is coupled to the tip segment 46 of digit 14 by joint 90. As may be seen in FIG. 5 base segment 42 preferably has a U-shaped cross sectional shape with digit linkage 86 configured so as to fit within the hollow portion of the U-shape so as to move freely therein.

Referring to FIGS. 3, 6(a), 6(b), 7(a), and 7(b), the operation of the digit actuation mechanism will be described. As described above, a linear drive force is provided along drive linkage 60 to transmission 80 via joint 82 resulting in a torque about both pivot joint 44 and joint 84. Spring 87 pulls on linkage 86 and thereby provides a small counter clockwise torque on differential transmission 80 about joint 84. This holds cam surface 81 of differential transmission 80 against tip segment parallel stop 112, when the digit is not in contact with an object. Therefore, actuation of the drive linkage 60 in a vertical upward direction will cause the base segment 42 to pivot about joint 44 in a clockwise direction while tip segment 46 translates in an arc about joint 44 but remains parallel to axis 50.

Upon contacting an object, however, free rotation about joint 44 will be stopped. Depending upon the contact point of the digit with the object, differential transmission 80 will pivot about either joint 84 or joint 44. This selective pivoting, determined from the point of contact with the object, will result in either an enveloping grip by the digit or a parallel vise grip illustrated in FIGS. 6(a), 6(b) and 7(a), respectively. The distances between joints 82 and 84 and 84 and 44 determine the critical contact point at which the grasping action of the digit changes from a parallel vise grip to an enveloping grip mode. In FIGS. 6(a) and 7(a) the critical contact point is illustrated at point 92 which divides the tip segment into an outer tip segment 94 and an inner tip segment 96. The point of contact with the object to be grasped relative to the critical contact point 92 automatically determines whether the grip will be in the enveloping mode or parallel vise grip mode.

Figure 6B:
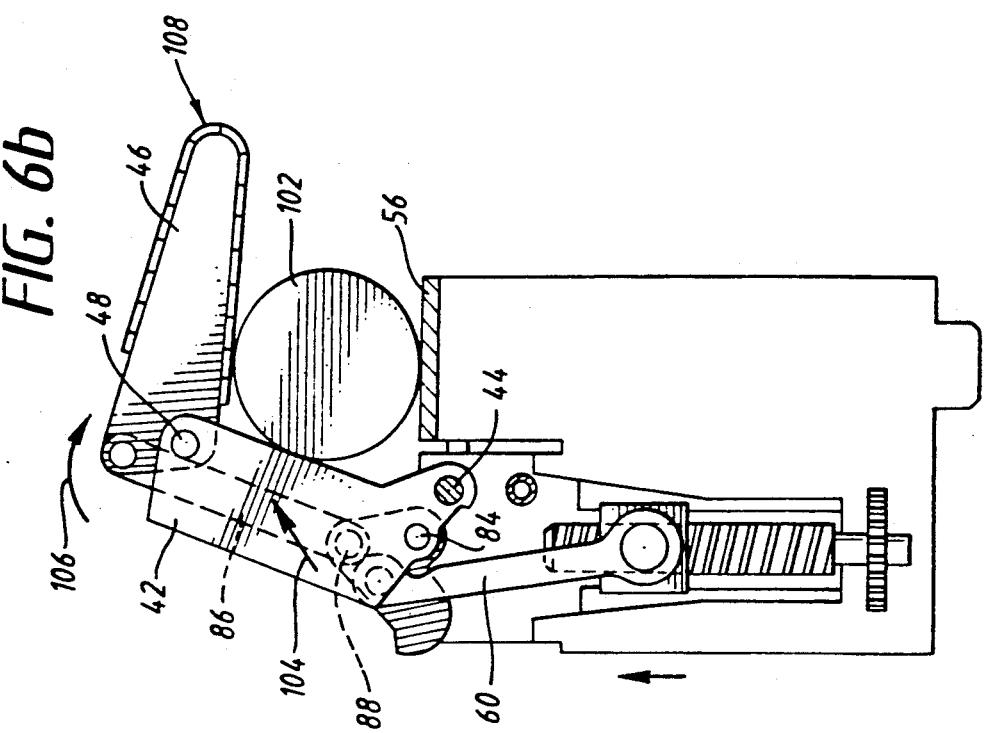
FIGS. 6(a) and 6(b) are successive views illustrating the enveloping grasp of a single digit of the end effector of the present invention.
Figure 6A:
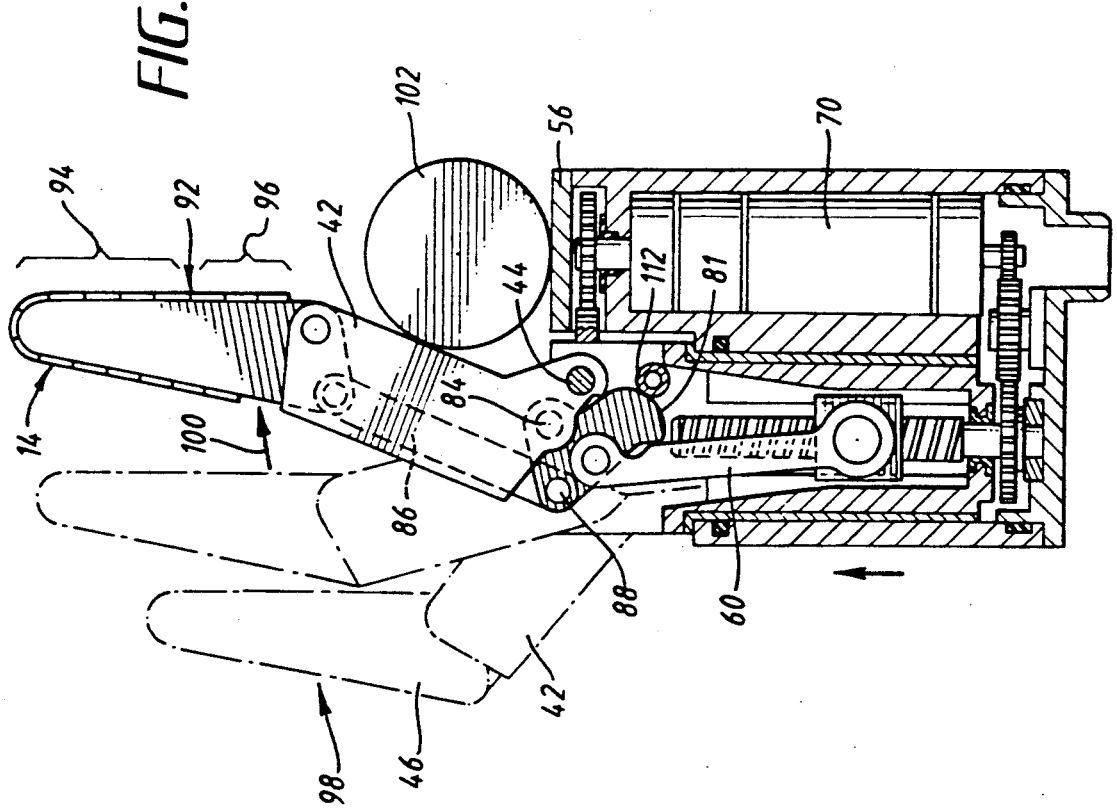

Referring to FIGS. 6(a) and 6(b), the enveloping grip of the end effector is illustrated with sequential positions of digit 14 shown contacting an object 102. The illustrated digit of the end effector is shown in an initial position 98 corresponding to an initially open configuration of the end effector (the other two digits not being shown). (The digit will readily be held in such an open, ready position, by means of spring 87). As the actuation mechanism is activated to close the end effector to grasp an object, the drive linkage 60 drives the differential transmission 80 with a component of torque about pivot joint 44 thereby causing the digit to pivot about joint 44 in the direction of arrow 100. The base segment 42 rotates and tip segment 46 translates in an arc about joint 44 until the object 102 is encountered. As shown in FIG. 6(a), the object 102 is first encountered by base segment 42, due to the position of the object 102 against the palm plate 56 and the relatively small size of the object. Contact with base segment 42 results in the base segment 42 being stopped from further rotation about joint 44. Further activation of drive linkage 60 by motor 70 causes differential transmission 80 to pivot about joint 84 driving joint 88 in the direction of arrow 104. This in turn drives digit linkage 86 in a corresponding direction causing the tip segment 46 to pivot about joint 48 in the direction of arrow 106. This pivoting action about joints 84 and 48 continues until the tip segment 46 contacts the object 102. Thus, in the final position 108 of the digit the object 102 is firmly clamped by the base segment 42 and tip segment 46 against palm plate 56 of the end effector. This provides an effective clamping grasp for a wide variety of objects. Furthermore, a brake mechanism positioned within the speed reduction gearing 72 may be locked into place at this position thereby holding the object 102 in an extremely strong clamped mode.

Referring to FIG. 7(a), the operation of the robotic hand in a parallel vise grip mode is illustrated. In FIG. 7(a), an object 103, is shown however at a position displaced from the palm plate 56. As in the case of FIG. 6(a), the end effector starts initially with the digits in an open position 98. As the motor drives the drive linkage upward to close the grasp of the robotic hand, base segment 42 swings freely about pivot 44 in the direction of arrow 100, as in the case of an enveloping grip described in relation to FIGS. 6(a) and 6(b). Upon contacting object 103 at the outer tip segment 94 of the digit, i.e. outside of critical contact point 92, the tip segment 46 is prevented from further translational motion. Tip segment 46 is also prevented from rotational motion because cam surface 81 is against tip segment parallel stop 112. Cam surface 81 was held against tip segment parallel stop 112 by spring 87 prior to any contact with object 103. Base segment 42 is now also effectively prevented from further motion because it is connected to tip segment 46 at joint 48. Any further actuation of the drive linkage 60 in a vertical upward direction will cause a build-up of clamping force against object 103 or the movement of object 103 to the right. With a second digit (not shown) positioned on the opposite side of object 103, the end effector in this configuration provides a strong parallel vise type grasp of the object 103.

Additionally, since the digits will selectively pivot leaving the tip segments parallel, a very useful automatic alignment feature advantageous for many robotics applications is provided. More specifically, since the rotation of the digit will occur about joint 44 with tip segment 46 parallel with an axis perpendicular to the surface 58 of the palm plate 56 of the end effector, any object grasped will automatically be aligned parallel with that axis. For robotics applications involving positioning of objects along an axis, such automatic alignment along a specified axis has considerable advantages in reduction of control algorithmns and sensing mechanisms employed with the robotic hand. Furthermore, this automatic alignment will occur wherever the object is contacted with respect to the palm plate and no lateral positioning of the object with respect to the palm plate is required.

Figure 7B:
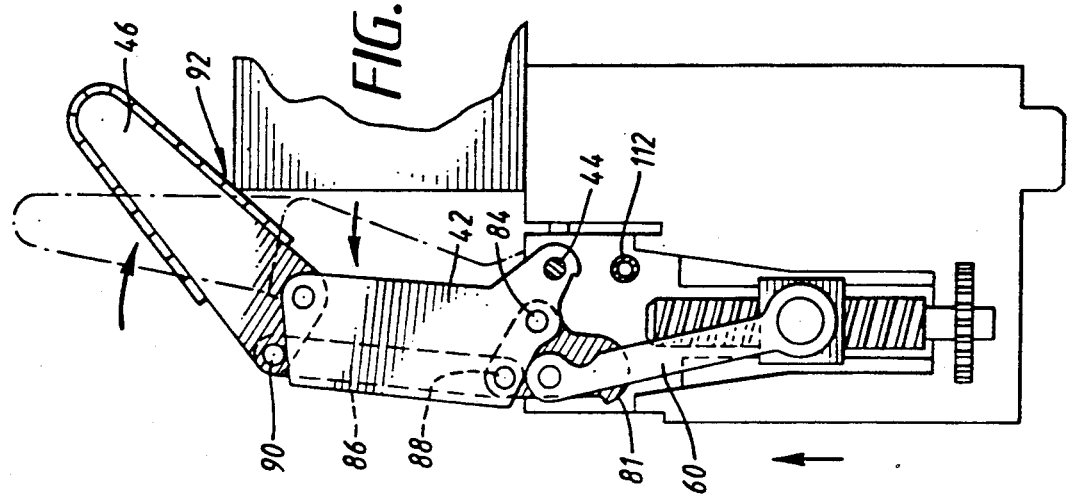
FIGS. 7(a) and 7(b) are successive views illustrating the parallel vise grip mode and enveloping mode, respectively of the end effector of the present invention.
Figure 7A:
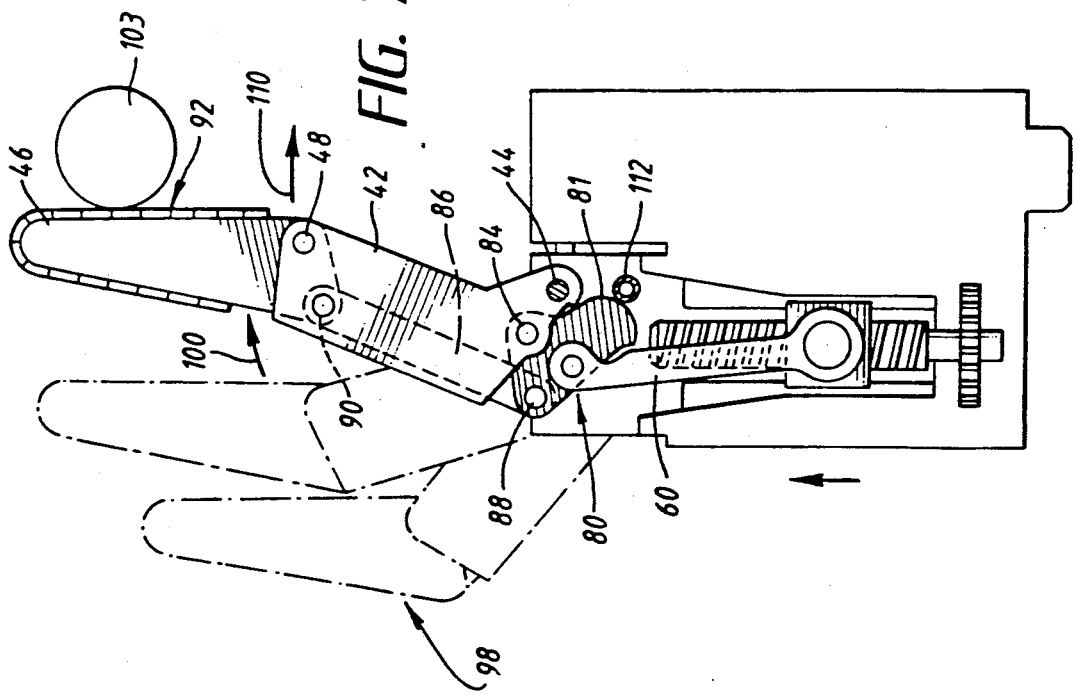

In FIG. 7(b), an object is shown grasped in the enveloping mode where the point of contact is just inside the critical contact point 92.

Figure 8:
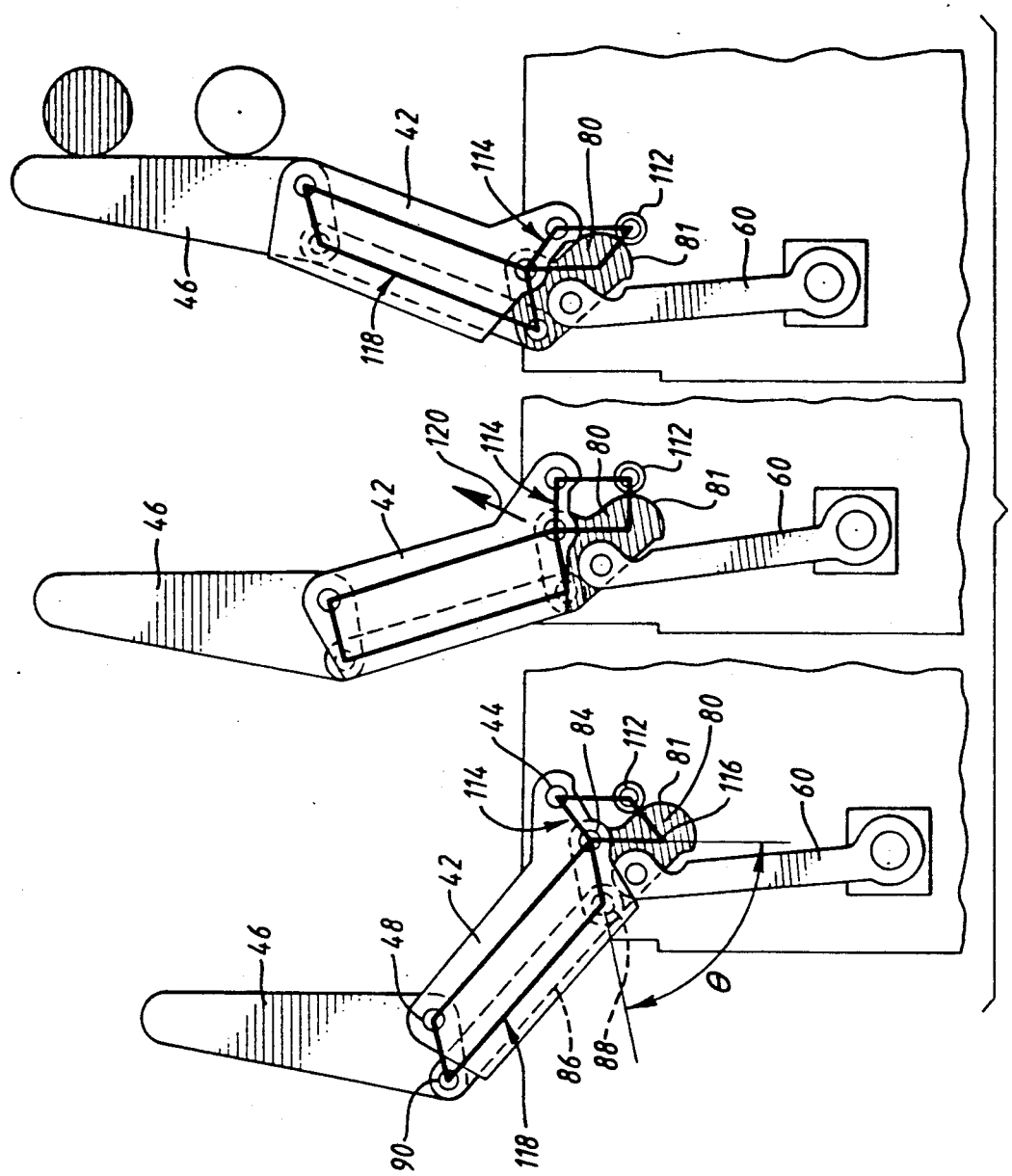
FIG. 8 is a schematic drawing illustrating the double parallelogram structure of the digit actuation mechanism employed in the end effector of the present invention.

The automatic parallel orientation of the tip segments described above may be appreciated more fully with reference to FIG. 8 which illustrates two related parallelograms formed by the various segments of each digit of the end effector. These two parallelograms ensure the tip segments do not bend backward past parallel and hence make possible the automatic parallel vise grip feature. These dual parallelograms are illustrated in schematic form in FIG. 8 as they change orientation as the digit goes through the positions illustrated in FIG. 7(a). The first parallelogram 114 is formed by parallel tip segment stop 112, joint 44, the center 116 of the differential transmission cam surface 81 and joint 84. The second parallelogram 118 is formed by joint 84, joint 88, joint 90 and joint 48. For simplicity, FIG. 8 illustrates the situation where cam surface 81 is positioned against tip segment parallel stop 112 throughout the motion of the digit. In other words, this corresponds to motion of the digit wherein the tip segment remains parallel through the motion of the digit. While the movement of the digit is not so constrained in normal operation, it may be substantially maintained by use of a spring (spring 87 in FIG. 3, for example) effecting a force between tip segment parallel stop 112 and the center 116 of cam surface 81. Since tip segment stop 112 and joint 44 are fixed, these two points provide a reference which will not change during the motion of the digit during a grasping motion driven by the actuation mechanism. These fixed reference points 44 and 112 thus define one side of first parallelogram 114 which remains fixed throughout the grasping operations of the robotic hand. Additionally, since the cam surface 81 is held against tip segment stop 112 by spring 87 and the side of the parallelogram 114 formed by the joint 84 and cam surface center 116 is fixed by the structure of the transmission 80, motion of the digit can only result in pivoting of the side of the parallelogram formed by points 116 and 84 in the direction of arrow 120. Thus, the side of the parallelogram formed by points 116 and 84 cannot change orientation during motion of the digit. Similarly, the fixed structure of the transmission 80 constrains points 88 and 84 of second parallelogram 118 to remain in a fixed orientation. In other words, the angle $\theta$ between these two respective sides of parallelograms 114 and 118 cannot change due to the fixed structure of the transmission 80. Therefore, since the side of the first parallelogram 114 must remain parallel to points 44 and 112, so must the side of second parallelogram 118 formed by points 88 and 84 remain at a fixed orientation. As a result, since second parallelogram 118 is constrained to be a parallelogram by its fixed sides, the side of the parallelogram formed by joints 90 and 48 also must remain in a fixed orientation parallel to the side formed by joints 88 and 84. This is clearly shown in FIG. 8 where it may be seen that as the digit goes through the positions shown in FIG. 7(a), the side of second parallelogram 118 formed by joints 90 and 48 always retains its orientation relative to the fixed axis formed by points 112 and 44. Since the tip segment of the digit is integral with the side of second parallelogram formed by joints 90 and 48, the orientation of the tip segment also cannot change. This orientation is determined by the shape of the differential transmission 80 in conjunction with the position of the joints forming the two parallelograms and is chosen so that tip segment 46 always remains parallel to the axis formed by points 44 and 112 when the tip segment is bent backward into its stopped position. This feature of the differential linkage mechanism employed by the robotic hand of the present invention allows the parallel vise grip feature and the automatic parallel alignment feature discussed above.

Referring to FIGS. 2 and 3, the mechanism for actuating rotation of the digits will be described. In a preferred embodiment, motor 70 provided for each digit drives the rotation of that digit as well as driving the actuation of the grasping operations described above. To enable such dual function of motor 70, a second speed reduction mechanism 122 is provided along with a clutch/brake mechanism 124 to provide a drive torque along shaft 126 independently operable from that provided on drive shaft 74. Rotation of shaft 126 drives gear 128 which in turn meshes with, and drives, gear 130 which is attached to the base of digit 14. The actuation mechanism including drive screw 64, drive linkage 60, and nut 66, is contained within cylindrical canister 32 shown in FIG. 2. The cylindrical enclosure or canister 32 is in turn free to rotate within a matching cylindrical opening 134 in housing 54. As shown in FIG. 4, the mounting of the drive screw 64 extending through the canister 32 may be mounted in a thrust bearing receptacle 136 which absorbs force from the payload transmitted through the drive screw 64. Additionally, watertight seals 138, 140, and 142 may be provided to maintain the motor 70 and associated gear train in an isolated environment from the ambient conditions in which the end effector is operated. Similarly, a seal 144 may be provided about shaft 126 to seal that end of the drive mechanism. This may thus provide a sealed drive mechanism suitable for use in chemical plant environments, underwater robotic applications or other applications where a potentially corrosive environment may be encountered. Thus the moving parts exposed to such environment would be kept to a minimum.

The independent rotation actuation mechanisms of off-axis digits 10 and 12 may similarly be provided by their respective digit actuator drive motors. In the case of off-axis, digits 10 and 12, however, the digit actuation mechanism is not positioned within a canister as in the case of digit 14 but rather is positioned within the digit base off-axis from a central pivot arm 146 (referring to digit 10 shown in FIG. 2). The pivot arm 146 fits into a notched opening 148 in palm plate 56 and a matching opening 150 in base plate 16. Since the palm plate 56 and base plate 16 are fixed, the rotation of the drive gear (not shown), mated to pivot arm 146 in the same manner as gears 128 and 130 described above, will cause the digit base 26 to pivot about pivot arm 146 on axis 28. This allows the digits 10 and 12 to swing about their respective axes of rotation 28 and 36 to reconfigure themselves on various sides of the payload as desired.

In an alternate embodiment, the independent drive mechanisms for rotation of the digits 10, 12 and 14 may be positioned within a wrist mount (not shown) below base plate 16. In such embodiment, the operation of the rotation mechanism will be essentially the same with however the digit base segments 26, 38 and 52 fixedly attached to rotation arms such as arm 146.

Referring to FIGS. 9, 10, 11(a), 11(b), 12(a), 12(b), 12(c), 13(a), 13(b), 13(c) and 14(a), 14(b) and 14(c), various orientations of the digits of the robotic hand are illustrated which demonstrate the versatility and effectiveness of the end effector of the present invention.

In FIG. 9, the reconfigurability of the off axis digits 10 and 12 allows positioning of digits 10 and 12 in opposition along the long axis of palm plate 56. This provides a wide grasp which, in conjunction with the parallel vise grip capability, allows large objects to be strongly grasped in a manner as illustrated.

In FIG. 10, the off axis reconfigurability of the digits 10 and 12 in conjunction with rotation capability of digit 14 allows relatively small objects to be grasped in a parallel vise grip as illustrated.

Figure 11A:
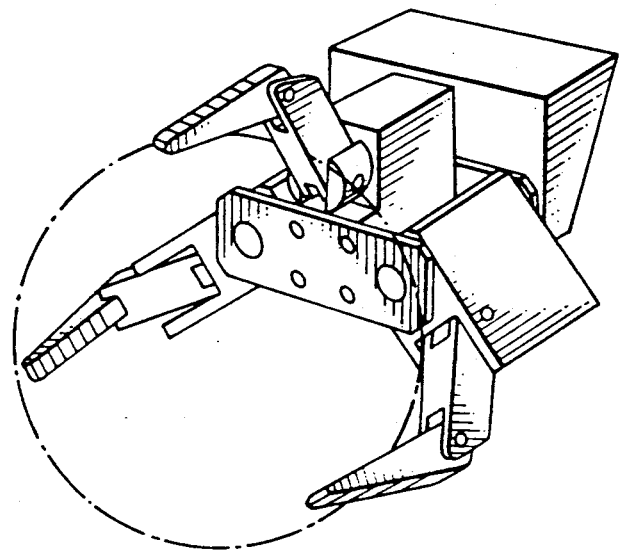
FIGS. 11(a) and 11(b) are drawings illustrating enveloping grips of the end effector of the present invention suitable for grasping round objects.
Figure 11B:
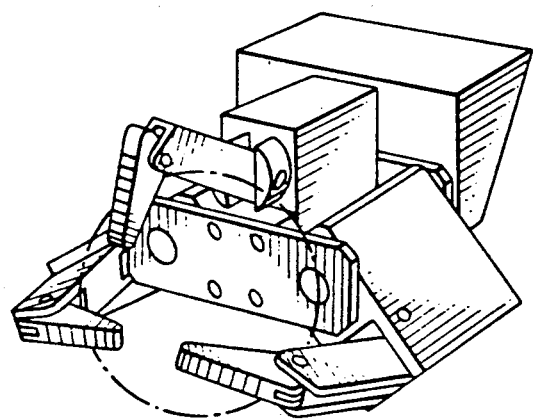

In FIGS. 11(a) and 11(b), various grasping configurations are illustrated with the digits positioned in a manner suitable for grasping cylindrical or spherical objects. The enveloping grip illustrated in FIG. 11 (a) and 11(b) will automatically cause effective grasping of spherical objects which are of a size such that they can be at least partially enveloped and thereby firmly clamped.

Figure 12A:
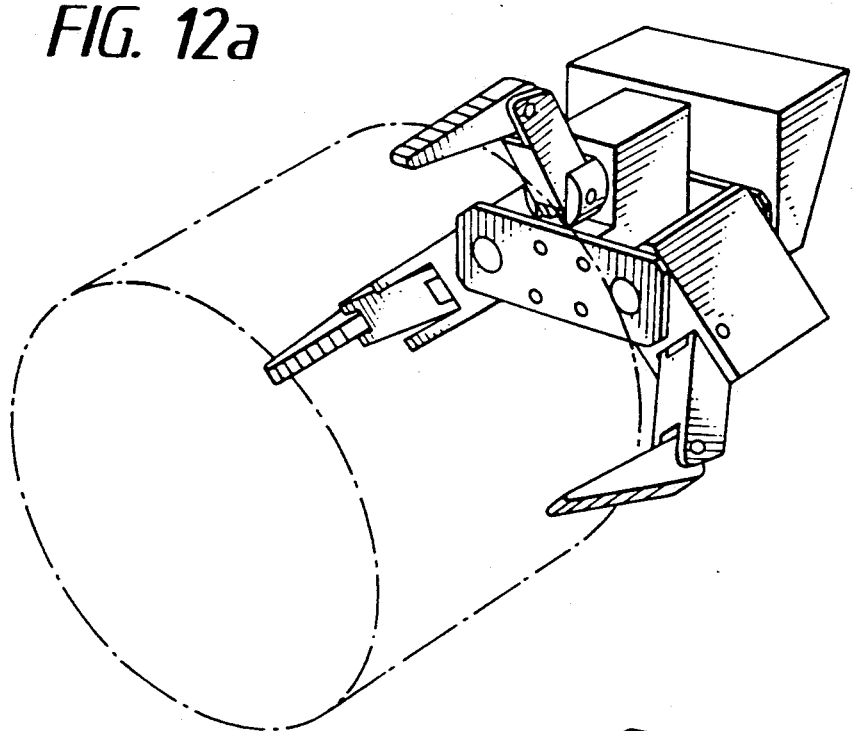
FIGS. 12(a), 12(b), and 12(c) are drawings illustrating grips of the end effector of the present invention suitable for grasping cylindrical objects.
Figure 12B:
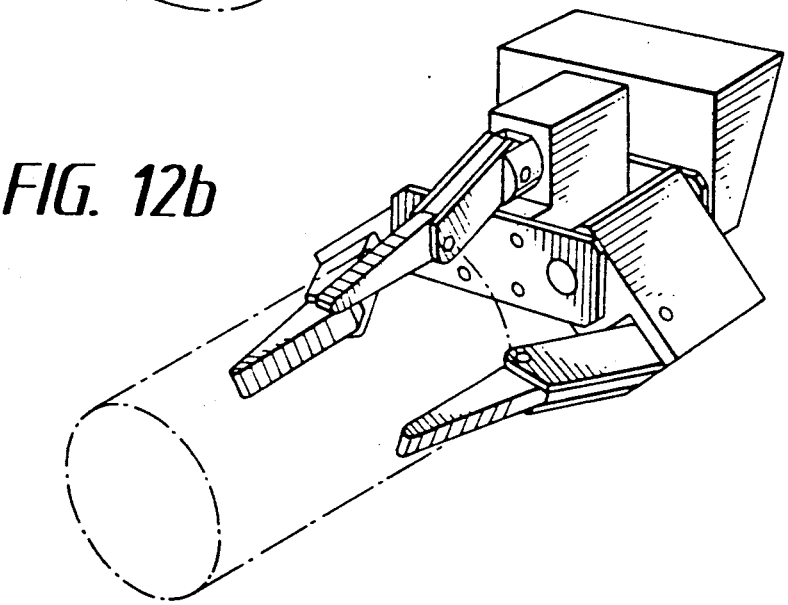
Figure 12C:
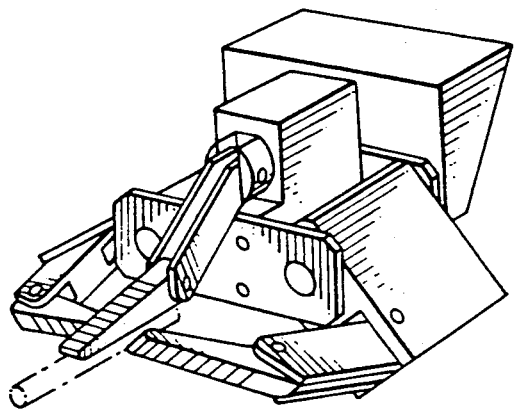

In FIGS. 12(a), 12(b) and 12(c), the parallel vise grip on varying size objects is illustrated. The combination of the configuration of the digits and the parallel type grip results in a Jacobs Chuck type grip which, as is well known, provides an effective grasp for cylindrical objects such as drill bits and other cylindrical shaped objects needed to be grasped in an end on manner, etc. In FIG. 12(c), this configuration is employed to grasp a relatively small cylindrical object. The grasping orientation illustrated in FIGS. 12(a), (b) and (c) may be advantageously employed with the automatic parallel alignment aspect of the present invention as described above to automatically align the axis of the cylindrical objects with the parallel grip axis. As described above, the parallel vise grip action will automatically force the three tip segments of the digits into a parallel configuration thereby forcing the object held in the vise grip into a matching alignment. This feature is greatly enhanced by the ability to align the object irrespective of the lateral position relative to the alignment axis in which it is grasped. This may be advantageously employed for use with a wide variety of robotic applications where objects such as drill bits, rivets, tubes, mounting pegs, etc. need to be mounted precisely into holes. The automatic parallel alignment feature thus simplifies the sensors and the control algorithms otherwise required by an end effector employed in such applications.

Figure 13A:
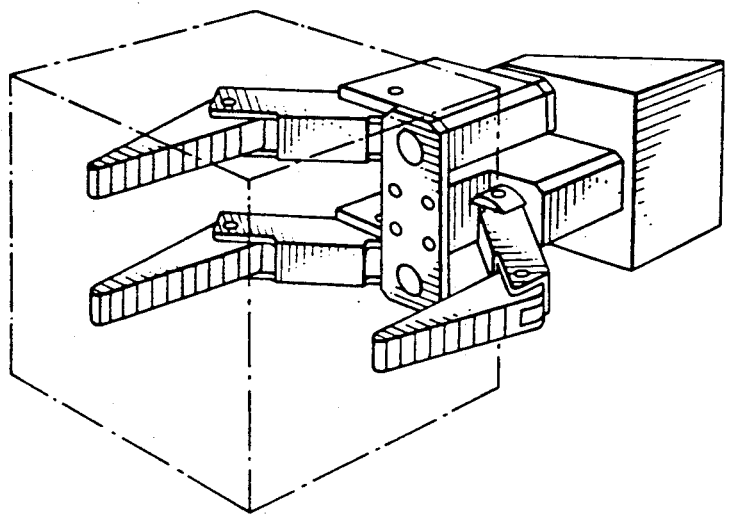
FIGS. 13(a), 13(b), and 13(c) are drawings illustrating various grips of the end effector of the present invention with the two off axis digits positioned opposite the on axis digit.
Figure 13B:
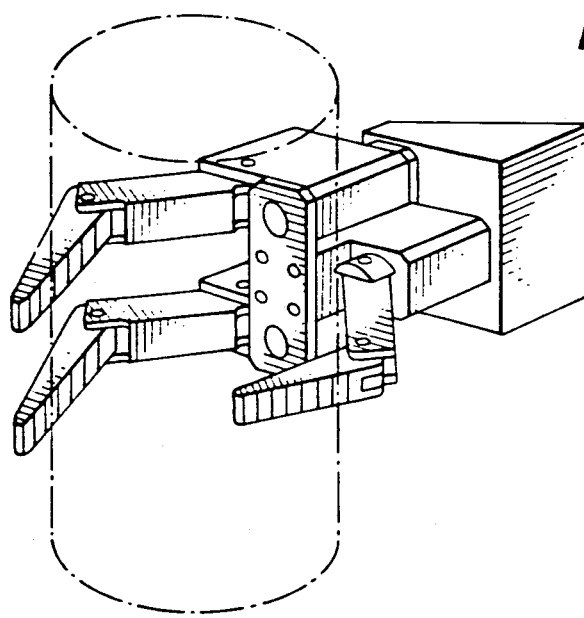
Figure 13C:
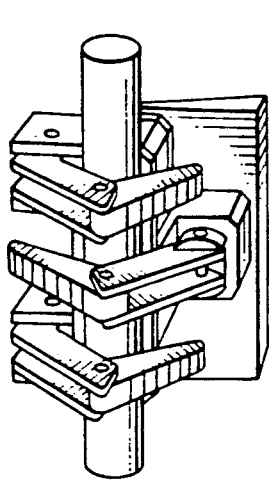

In FIGS. 13(a), (b), and (c), several possible applications of a configuration with the two off axis digits 10 and 12 positioned on the opposite side of the payload from on axis digit 14 are shown. This configuration provides an effective clamping grasp in either the enveloping mode or the parallel vise grip mode.

Figure 14A:
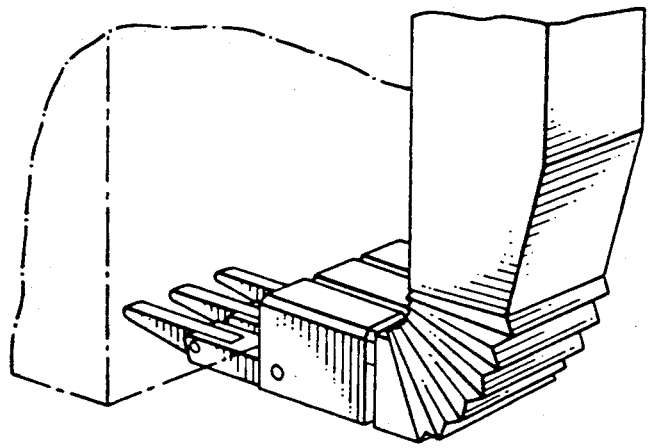
FIGS. 14(a), 14(b), and 14(c) are drawings illustrating various coincident digit grips of the end effector of the present invention.
Figure 14B:
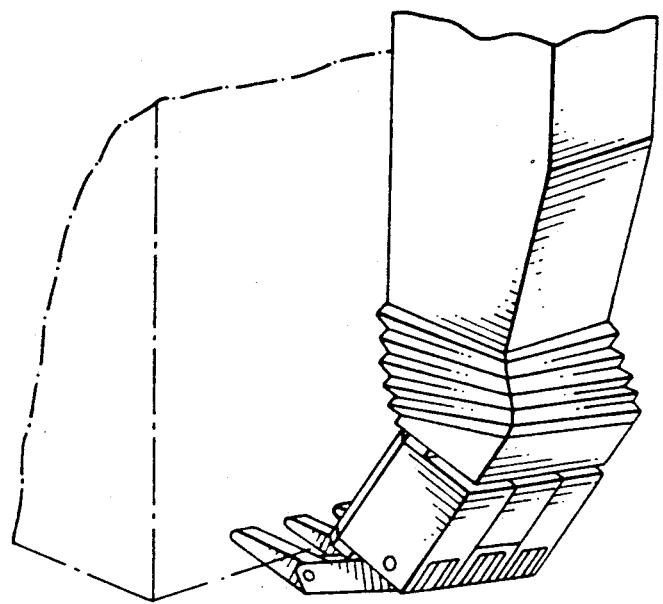
Figure 14C:
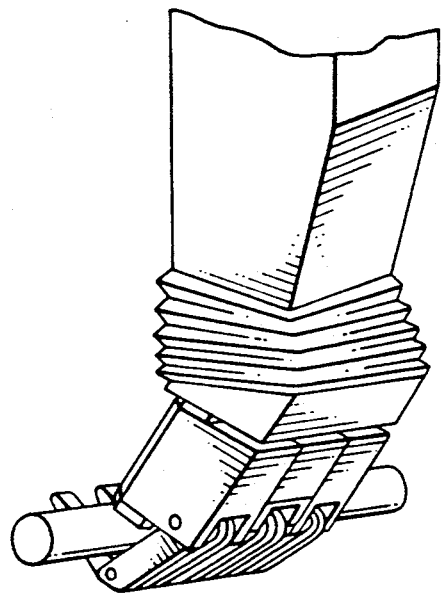

In FIGS. 14(a), (b), and (c), coincident digit configurations are illustrated where digits 10 and 12 have been swung about the payload to the same side as digit 14 thereby forming an anthropomorphic configuration suitable for cradling or lifting applications. With the motor and drive mechanisms locked this provides an extremely strong configuration.

Accordingly, it will be appreciated that the above noted features of the present invention provide a highly reconfigurable end effector. Additionally, the relatively simple but powerful actuation mechanism provides a strong grasping capability with relatively few moving parts wherein each digit is independently driven by a single motor.

It will be further appreciated by those with skill in the art that a wide variety of design variations are possible all remaining within the scope of the present invention.

What is claimed is:

1. An end effector comprising:
   a base member;
   a first digit mounted on said base member and having two pivoting degrees of freedom about first and second pivot points and a rotational degree of freedom about a first rotation axis offset from said first pivot point;
   a second digit mounted on said base member and having two pivoting degrees of freedom about first and second pivot points and a rotational degree of freedom about a second rotation axis offset from said first pivot point of said second digit and substantially parallel to said first axis; and
   a third digit mounted on said base member and having two pivoting degrees of freedom about first and second pivot points and a rotational degree of freedom about a third rotation axis aligned so as to run through a position adjacent to said first pivot point of said third digit and substantially parallel to said first and second rotation axes;
   wherein said first, second and third digits have an asymmetrical configuration such that said digits are reconfigurable from a first position where said first and second digits are aligned with said third digit to a second position where said first and second digits oppose said third digit.

2. An end effector as set out in claim 1 wherein said first and second digits are continuously rotatable through angular ranges of 180° about said first and second axes, respectively.

3. An end effector as set out in claim 1, wherein said first, second and third digits comprise:
   a tip segment;
   a base segment; and
   a digit base;
   wherein said tip segment is coupled to said base segment at said second pivot point and said base segment is coupled to said digit base at said first pivot point.

4. An end effector as set out in claim 1 wherein said first, second and third digits are independently actuated for rotation about said first rotation axis, second rotation axis and third rotation axis, respectively.

5. An end effector as set out in claim 1 wherein each of said first, second and third digits pivot about axes perpendicular to said substantially parallel first, second and third rotation axes.

6. An end effector comprising:
   a base member; and
   first, second and third grasping means coupled to said base member, each having a tip segment capable of pivoting to conform to the shape of an object, each grasping means having two portions located on either side of a critical contact point spaced apart from said base member, for providing, upon contact with an object, an enveloping grasping mode wherein at least two of said grasping means exert a net force on the object toward said base member, or a parallel grasping mode wherein at least two of said grasping means each exert a net force on the object in substantially parallel but opposite directions during grasping of the object, wherein the contact with the object causes a pivoting about the critical contact point of the tip segment to cause the grasping means to envelop the object or grasp the object in the parallel mode as determined by the portion of said grasping means which first contacts said object.

7. An end effector as set out in claim 6, wherein the base member has a support surface and the forces exerted by the grasping means in said parallel grasping mode are parallel to the support surface of the base member.

8. An end effector comprising:
   a base member; and
   first, second and third grasping means coupled to said base member, each having two portions located on either side of a critical contact point spaced apart from said base member, for providing, upon contact with an object, an enveloping grasping mode wherein at least two of said grasping means exert a net force on the object toward said base member, or a parallel grasping mode wherein at least two of said grasping means each exert a net force on the object in substantially parallel but opposite directions during grasping of the object, said grasping mode being determined by the portion of said grasping means which contacts said object, wherein each of said first, second and third grasping means have first and second segments having pivoting degrees of freedom about respective first and second pivot points and comprises:
    linear drive means for providing a linear drive force;
    differential transmission means for providing a selective rotation about said first and second pivot points in response to said linear drive force; and
    means for enforcing said two or more of said first segments to remain substantially parallel during said parallel grasping mode.

9. An end effector as set out in claim 8 wherein said linear drive means comprises a lead screw, a nut driven by said lead screw, and a drive linkage rotatably coupled to said nut.

10. An end effector for grasping a payload comprising:
    a base member;
    first digit means, rotatably mounted on said base member so as to rotate about a first rotation axis, for pivoting toward said payload about first and second pivot axes;
    second digit means, rotatably mounted on said base member so as to rotate about a second rotation axis, for pivoting toward said payload about first and second pivot axes; and
    third digit means, rotatably mounted on said base member so as to rotate about a third rotation axis, for pivoting toward said payload about first and second pivot axes;
    wherein said first, second and third digit means are reconfigurable from a position where said first, second and third digit means pivot in the same direction to a position where said first and second digit means pivot in a direction opposed to that of said third digit means.

11. An end effector as set out in claim 10 wherein said first and second digit means are continuously rotatable about said first and second rotation axes respectively, through an angle of 180° about said payload.

12. An end effector as set out in claim 11 wherein each of said first and second digit means are independently reconfigurable to any position around their respective 180° angular range.

13. An end effector as set out in claim 12 wherein the respective angular ranges of said first and second digit means are in opposite angular directions.

14. An end effector as set out in claim 10 wherein said first, second and third digit means each have single actuating means for actuating both pivoting and rotational motion.

15. An end effector as set out in claim 10 wherein said pivoting axes of said first, second and third digit means are perpendicular to the respective axes of rotation of said digit means.

16. An end effector as set out in claim 10 wherein said first, second and third rotation axes are substantially parallel.

17. An end effector as set out in claim 10 wherein said first, second and third digit means are positioned in a side by side configuration when in said position where they pivot in the same direction.

18. A digit actuation mechanism for use with a digit of a type suitable for use in an end effector said digit having a base segment rotatable about a first pivot point and a tip segment rotatably coupled to said base segment at a second pivot point, comprising:
    means for providing a linear drive force;
    a drive linkage rotatably coupled to said means for providing a linear drive force;
    differential lever means rotatably coupled to said drive linkage and rotatably coupled to said base segment at a third pivot point, for providing a differential rotation about said first pivot point and said third pivot point such that said digit segments are rotated to envelop an object only when the object is contacted at a portion of said digit including said base segment and extending to a critical contact point located on the tip segment; and
    means for enforcing said tip segment to remain in a substantially constant orientation when the object is contacted at a portion of said tip segment outside of said critical contact point.

19. An actuation mechanism as set out in claim 18 further comprising a digit linkage coupling said differential lever means and said tip segment.

20. A digit actuation mechanism as set out in claim 19, wherein said differential lever means comprises a curved cam member coupled to the drive linkage at a drive linkage coupling point and coupled to the digit linkage at a digit linkage coupling point and wherein said third pivot point, the drive linkage coupling point, and the digit linkage coupling point are located at positions in said cam member so as to provide the differential rotation.

21. A digit actuation mechanism as set out in claim 18, further comprising:
    means for preventing the tip segment from rotating outwardly about said second pivot point beyond an orientation parallel to a predetermined alignment axis of said end effector.

22. A digital actuation mechanism as set out in claim 21, wherein said end effector comprises a base member, wherein said digit base segment is mounted to said base member at said first pivot point and wherein said means for preventing is mounted to said base member.

23. A digit actuation mechanism for use with a digit of a type suitable for use in an end effector said digit having a base segment rotatable about a first pivot point and a tip segment rotatably coupled to said base segment at a second pivot point, comprising:
    means for providing a linear drive force;
    a drive linkage rotatably coupled to said means for providing a linear drive force;
    differential lever means rotatably coupled to said drive linkage and rotatably coupled to said base segment at a third pivot point, for providing a differential rotation about said first pivot point and said third pivot point; and
    means for preventing the tip segment from rotating outwardly about said second pivot point beyond an orientation parallel to a predetermined alignment axis of said end effector;
    wherein said means for preventing comprises a parallel stop pin and wherein first and second parallelograms are formed by segments of said differential lever means and said tip segment and said base segment.

24. A digit actuation mechanism as set out in claim 23, wherein said end effector comprises a base member, wherein said digit base segment is mounted to said base member at said first pivot point, and wherein said stop pin is mounted to said base member.

25. An end effector comprising:
a base member;
at least two grasping means coupled to said base member, each having a generally planar grasping surface, each planar grasping surface having two portions located on either side of a critical contact point spaced apart from said base member, for providing an enveloping or parallel vise grip grasping mode upon contact with an object, said grasping mode being determined by which portion of said planar grasping surface makes contact with said object; and
means for enforcing said planar grasping surfaces of the respective grasping means to remain parallel while grasping an object when said end effector is in said parallel grasping mode.

* * * * *